Patented Mar. 20, 1934

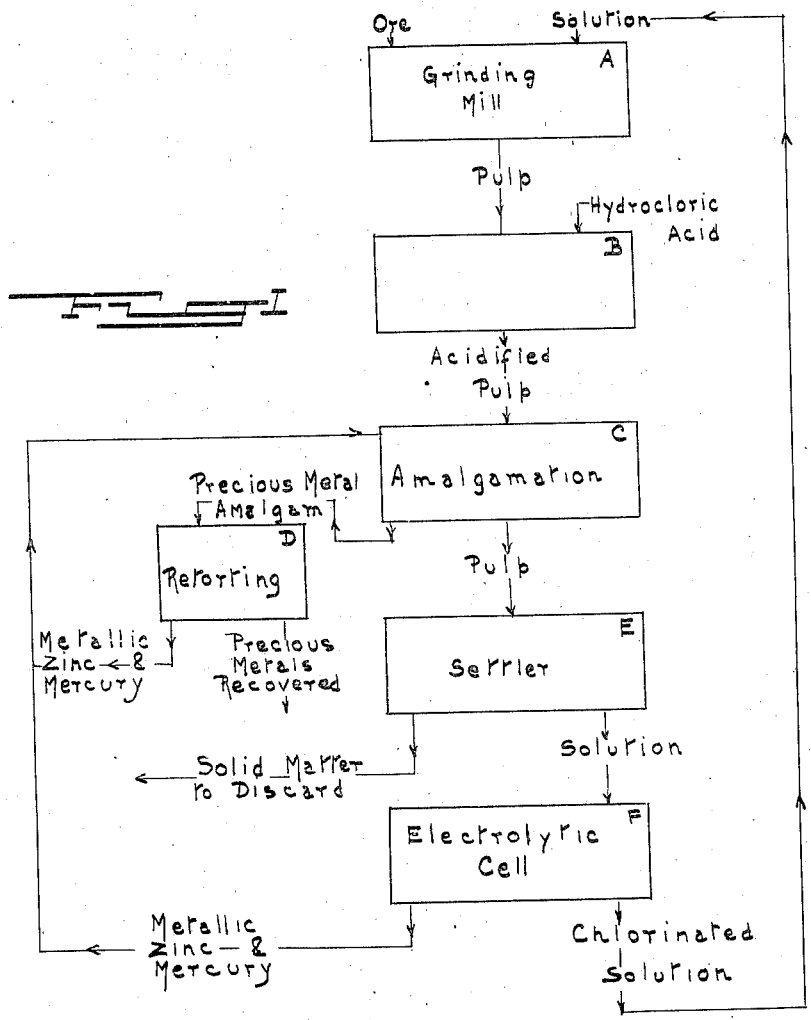
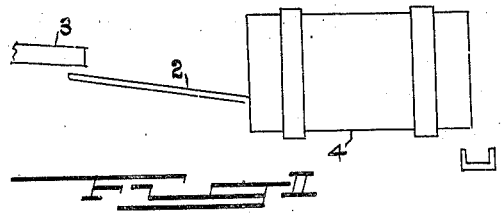

1,951,822

UNITED STATES PATENT OFFICE 1,951,822

RECOVERY OF PRECIOUS METALS BY AMALGAMATION

Diederick Enzlin, Troyeville, Johannesburg, Transvaal, and John Alfred Eklund, Pietersburg, Transvaal, Union of South Africa Application August 27, 1928, Serial No. 302,318
In Union of South Africa December 20, 1927

2 Claims. (Cl. 209—176)

The present invention refers to the recovery of gold, silver, and the metals of the platinum group (herein referred to as platinum) by amalgamation methods. This invention is applicable to sulphide and oxide platinum ores and to both free-milling and refractory gold ores. The invention permits the recovery of the metals directly from their ores without preliminary concentration of the ores, though it is also applicable to concentrates.

According to this invention the comminuted ore or other material containing the precious metal is brought into contact with zinc amalgam in the presence of an activator, the precious metal being thereby amalgamated and retained by the amalgam. The amalgam is for preference applied to an iron or nickel surface.

By itself, zinc amalgam is substantially inactive towards platinum and many refractory gold occurrences. The term activator, as used in this specification, denotes a substance in solution or suspension which causes the zinc amalgam actively to amalgamate with the metal to be recovered.

Our investigations indicate that highly complicated reactions occur between the activator, the ore constituents and the elements of the amalgam and that these reactions differ with different activators and different ores; but in a broad sense the function of the activator appears to be (a) that of rendering the surface of the metallic or mineral particles bright, by removing any deterrent coating such as one of oxide, sulphide, arsenic, antimony or adsorbed oxygen; and (b) in the case of platinum group metals or minerals, that of preventing oxidation or adsorption of oxygen and so promoting the covering or wetting of the particles by the amalgam.

We have found, that in a general way any substance or combination of substances that acts as a flux for zincing or tinning metal articles has utility as an activator in our process. Thus chlorine and many chlorine compounds can be used; also phosphoric acid and its compounds; alums such as ammonia alum or potassium alum; and lactose or lactic acid in association with glycerine. A simple test is usually sufficient to ascertain what activator is best suited to a particular ore or material.

An activator which we have found to be of general utility is an aqueous solution of a mercuric hydrochloride salt, zinc chloride, hydrochloric acid, and free chlorine. The mercuric hydrochloric salt may be mercuric tri-chloride (H.Hg.Cl$_3$), mercuric tetra-chloride (H$_2$.Hg.Cl$_4$) or mercuric penta-chloride (H.Hg$_2$.Cl$_5$) or any combination of them. Improved results are generally attained if an alkali chloride such as sodium chloride is present. This appears not to function directly as an activator but rather as a catalyst which links the mercuric and zinc salts, the resulting double salt being a better activator constituent than the separate salts.

This activator is found to work well with platinum ores and with gold ores, both free-milling and refractory. It may be prepared beforehand by dissolving the separate constituents in water and this is the preferable course when treating single portions of ore: but it is sufficient to provide initially in the solution any one of the constituents and to allow time for the formation of the others, which naturally occurs when the solution is brought into association with the amalgam.

For instance the commercial hydrochloric acid contains free chlorine, and a solution of it in water thus at once provides the hydrochloric acid and the chlorine. These re-act with the mercury and zinc of the amalgam to form the aforesaid mercuric and zinc salts.

Similarly a solution of either zinc chloride or mercuric hydrochloride dissociates upon solution in water and provides hydrochloric acid and free chlorine which again react with the metals of the amalgam to form the normal solution.

Accordingly a useful procedure is to circulate the liquid with periodical additions of activator-forming material, and to make use of the activator solution thus formed.

The process in its preferred form thus consists in crushing the ore to about minus two hundred mesh in solution which has already passed through the process and contains mercuric hydrochloride salts, zinc chloride, chlorine and sodium chloride.

A small quantity of hydrochloric acid is then added to the pulp and the acidified pulp is passed over an iron or nickel surface coated with zinc amalgam, which retains the precious metal. At the same time the hydrochloric acid reacts with the zinc amalgam, producing a further quantity of mercuric and zinc salts which goes into solution.

After passing off the amalgamated surface the solid and liquid constituents of the pulp are separated, as by settlement; and the solid constituent, containing some solution, is discarded.

The clarified solution is passed through an electrolytic cell, wherein some of the zinc and mercury carried in solution are deposited on the cathode, the quantity thus deposited being approximately that dissolved when the pulp was passed over the amalgamated surface, thus keeping the strength of the solution constant and preventing the zinc and mercury salts from building up to an undue concentration.

The metallic zinc and mercury so recovered may be used for re-dressing the amalgamated surface. Sodium chloride may be decomposed in the electrolytic cell but at once recombines with the chlorine present.

The chlorine liberated by the electrolytic step goes into solution in the liquid. The latter is now returned for crushing further quantities of ore or metalliferous material and passes again through the same cycle, water being added as necessary to make up that lost with the discarded tailings. The chlorine carried in solution from the electrolytic cell functions as an activator constituent when the pulp next passes over the amalgamated surface and in doing so combines with zinc and mercury, from which it is again liberated in the next passage through the electrolytic cell.

The process may be started with a solution of zinc chloride, mercuric chloride, and hydrochloric acid, with or without chlorine and sodium chloride; but thereafter it would be necessary to add only water to make up the required bulk and as much hydrochloric acid as is necessary to keep the solution up to normal strength.

A solution strength which has been found satisfactory consists of

| | Per cent by weight |
|---|---|
| Hydrochloric acid | 1.000 |
| Zinc chloride | 0.250 |
| Chlorine | 0.025 |
| Mercuric hydrochloride | 0.005 |
| Sodium chloride | 0.250 |

These proportions may be varied considerably. For gold ores the amount of acid may be such that the solution is approaching neutrality when it leaves the amalgamated surfaces; but for all platinum ores a greater amount of acid should be used.

The amalgam is periodically scraped from the amalgamated surface and retorted to drive off the zinc and mercury, which may be condensed and recovered for further use.

The process is illustrated as a flow sheet in Fig. I of the accompanying drawing. Therein A indicates a grinding mill to which the circulated liquid and fresh ore are fed. The pulp from A receives an addition of hydrochloric acid in step B and then flows over the amalgamated surface in step C. A product of step C is the precious metal amalgam which is retorted in step D with separate recovery of the precious metals and the amalgam metals. A further product is the impoverished pulp which passes to the pulp settler indicated by E. The solid constituent of the pulp is discarded at this step and the clarified liquid passes on to the electrolytic cell F, the zinc and mercury product which eventually goes back to step C for re-use. The liquid discharged from F is returned to the crushing step A.

For electrolysis of the solution in step F, it is desirable to employ a current density of approximately ten to fifteen amperes per square foot of cathode area. This is usually obtained by employing four to six volts, according to the amount of zinc in solution.

Fig. II illustrates a useful form of amalgamating apparatus. This consists of an iron plate 2 coated with zinc amalgam, the pulp being fed at 3 to its upper end. As this plate is open to inspection it is of value in allowing the operator to see that the amalgamation process is proceeding properly, as indicated by the slight mist arising from the pulp due to the liberation of hydrogen. Following the plate 2 the pulp flows through the lower portion of a slightly inclined rotating iron drum 4 coated internally with zinc amalgam. This provides within a small compass a large amalgamated area with which the pulp comes into contact.

It is found to be desirable to have a relatively long period of contact between the ore and the activator solution before the pulp is passed over the amalgam. In the case of gold ores, five minutes is generally a suitable time for the preliminary mixing of the ore with the activator solution, whilst in the case of platinum ores from thirty minutes to an hour is usually required. After this mixing the actual amalgamation takes place rapidly, in a period ranging from fifteen to sixty seconds.

In the case of ores containing gold, or platinum in the metallic state, the amalgamation takes place on the metal itself after its surface has been cleaned by the activator solution. In the case of an ore containing combined platinum e. g. sperrylite, the action appears to be that the surface of the mineral particle is decomposed by the activator solution, platinum going into solution. This is precipitated by the zinc present, forming zinc platinum amalgam so that the particle is wetted by the amalgam and is absorbed therein.

Colloids tend to prevent the amalgamation of the metallic or metalliferous particles, however clean and bright the metallic surfaces may be. This difficulty is overcome by the presence of the zinc chloride; acetic acid being also added in some cases, as when hydrated ferric oxide is present, to promote amalgamation by preventing the formation of a film of hydroxide gel in the interstices of the amalgam.

Certain base metals which are present in the ore, such as nickel, copper and iron become amalgamated with the precious metals. They may be removed by treating the product of the amalgam retorting step with acid which dissolves them and leaves the precious metal undissolved.

Arsenic and antimony are not as a rule extracted by the amalgamation procedure, but are left in the ore and may if desired be recovered from it by a further operation. In the case however, of sperrylite, the treatment causes the granules to be superficially modified whereby they enter the amalgam, but the body of the granule remains unchanged so that in this case most of the arsenic appears in the amalgam, from which it is driven off by the retorting operation.

Examples of the applications of the invention to different ores are given below.

*I*

The ore was the well known pyritic gold ore of the Witwatersrand and assayed 4.2 dwts gold per ton.

This was treated by pulverizing it and mixing it with a solution formed by dissolving in water

| | Per cent by weight |
|---|---|
| Hydrochloric acid | .500 |
| Zinc chloride | .250 |
| Mercuric chloride | .002 |
| Sodium chloride | .100 |
| Chlorine | .006 |

The pulp thus produced was agitated for five minutes to ensure intimate contact between the ore and the solution and was then passed once over an amalgamated iron plate 12 feet long. It was then filtered and the clear solution was tested for gold and found to contain merely a trace. The solid residue assayed .2 dwt per ton, showing a recovery of 95.23 per cent.

II

In this case the trial was made with a gold ore from the leader reef of the "County Down" mine, Murchison Range, Leydsdorp district, Transvaal, containing grey copper, antimony, and arsenic.

The ore assays about eighteen pennyweights per ton, but has never been successfully worked on account of its highly refractory nature.

The activator solution in this case was made by dissolving in water

| | Per cent by weight |
|---|---|
| Hydrochloric acid | 1.0 |
| Zinc chloride | .25 |
| Mercuric chloride | .002 |
| Sodium chloride | .1 |
| Chlorine | .006 |

The method of treatment and testing was the same as in Example I, and the result showed an extraction of 96 per cent of the gold.

III

The ore in this case was from the main reef of the "County Down" mine referred to above. This reef contains arsenic and antimony, but little copper. The activator solution used was made up of

| | Per cent by weight |
|---|---|
| Hydrochloric acid | 1.75 |
| Zinc chloride | .5 |
| Mercuric chloride | .003 |
| Sodium chloride | .25 |
| Chlorine | .025 |

With the same treatment as in Example I, a gold recovery of 89 per cent was obtained.

IV

A sulphide platinum ore from the Eerstgeluk mine, Lydenburg district, Transvaal, assaying 6.6 pennyweights platinum metals per ton.

This was treated with a solution containing

| | Per cent by weight |
|---|---|
| Hydrochloric acid | 1.0 |
| Zinc chloride | .25 |
| Mercuric chloride | .005 |
| Sodium chloride | .25 |

After thorough agitation of the finely crushed ore with the solution for an hour, the resulting pulp was caused to flow over an iron plate amalgamated with zinc amalgam.

The assay value of the residue, averaged from several tests, was 1.55 showing an extraction of 76.5%. Faint traces of platinum appeared in the solution.

The platinum metals extracted in one of the residue tests were recovered and amounted to 9.06 milligrams from 1000 grams of ore. This represents a recovery of 5.25 pennyweights per ton, which agrees fairly closely with the figure given above.

Another test on the same ore but with the addition of a small quantity of free chlorine to the solution, gave an extraction of 78 per cent.

V

Oxidized platinum ore from the Rustenburg district Transvaal, assaying 6.4 pennyweights per ton. Treatment as in Example IV but without sodium chloride produced a tail assaying 1.2 pennyweights per ton, equal to 81 per cent extraction.

We claim:

1. The cyclic method of recovering precious metals by amalgamation which consists in repeatedly circulating a solution and during the course of circulation mixing it with the comminuted metalliferous material to be treated, adding hydrochloric acid, thereafter bringing the pulp into contact with zinc amalgam, then separating the solid material from the solution, then treating the solution and thereby removing surplus zinc and mercury from the solution and forming chlorine therein.

2. The method of recovering precious metals by amalgamation, which consists in bringing the metalliferous material into association with zinc amalgam in the presence of a solution of a mercuric hydrochloric salt, zinc chloride, hydrochloric acid, and free chlorine.

DIEDERICK ENZLIN.
JOHN ALFRED EKLUND.